(12) United States Patent
Rogers

(10) Patent No.: US 6,824,190 B1
(45) Date of Patent: Nov. 30, 2004

(54) TRUCK VAULT

(76) Inventor: Steven M. Rogers, 126 16th St., P.O. Box 916, Ogden, KS (US) 66517

( * ) Notice: Subject to any disclaimer, the term of this patent is extended or adjusted under 35 U.S.C. 154(b) by 0 days.

(21) Appl. No.: 10/639,257

(22) Filed: Aug. 12, 2003

(51) Int. Cl.[7] .................................................. B60P 7/02
(52) U.S. Cl. ............................ 296/100.09; 296/100.06; 296/37.6
(58) Field of Search ....................... 296/100.01, 100.06, 296/100.09, 37.6

(56) References Cited

U.S. PATENT DOCUMENTS

| | | | |
|---|---|---|---|
| 4,313,636 A | 2/1982 | Deeds | |
| 4,418,954 A | 12/1983 | Buckley | |
| 4,747,441 A | * 5/1988 | Apolzer et al. | ............. 160/206 |
| 4,784,427 A | 11/1988 | Burgess | |
| 4,844,531 A | 7/1989 | Kooiker | |
| 4,943,194 A | 7/1990 | Aguilar | |
| 5,201,561 A | 4/1993 | Brown | |
| 5,427,428 A | * 6/1995 | Ericson et al. | ................. 296/98 |
| 5,564,773 A | 10/1996 | Lapsley et al. | |
| 5,653,491 A | * 8/1997 | Steffens et al. | ........ 296/100.09 |
| 5,961,173 A | * 10/1999 | Repetti | ...................... 296/37.6 |
| 6,059,350 A | * 5/2000 | Kooiker | ................. 296/100.09 |
| 6,095,588 A | * 8/2000 | Rodosta | ................. 296/100.09 |
| 6,176,541 B1 | * 1/2001 | Hoff | ...................... 296/100.09 |
| 6,203,086 B1 | 3/2001 | Dirks et al. | |
| 6,302,468 B1 | 10/2001 | Steadman | |
| 6,322,128 B1 | 11/2001 | Karrer | |
| 6,352,296 B1 | 3/2002 | Kooiker | |
| 6,382,699 B1 | * 5/2002 | Hanson | ................. 296/100.09 |
| 6,422,635 B1 | * 7/2002 | Steffens et al. | ........ 296/100.09 |
| 6,435,594 B1 | 8/2002 | Ekonen | |
| 6,527,326 B2 | * 3/2003 | Henderson | .................... 296/61 |

* cited by examiner

Primary Examiner—D. Glenn Dayoan
Assistant Examiner—Greg Blankenship
(74) Attorney, Agent, or Firm—Chase Law Firm, L.C.

(57) ABSTRACT

A vault for securing the contents a truck bed, including a raised or elevated forward section and multiple, articulated panels arranged to cover the bed of a truck and lock into a closed position.

17 Claims, 4 Drawing Sheets

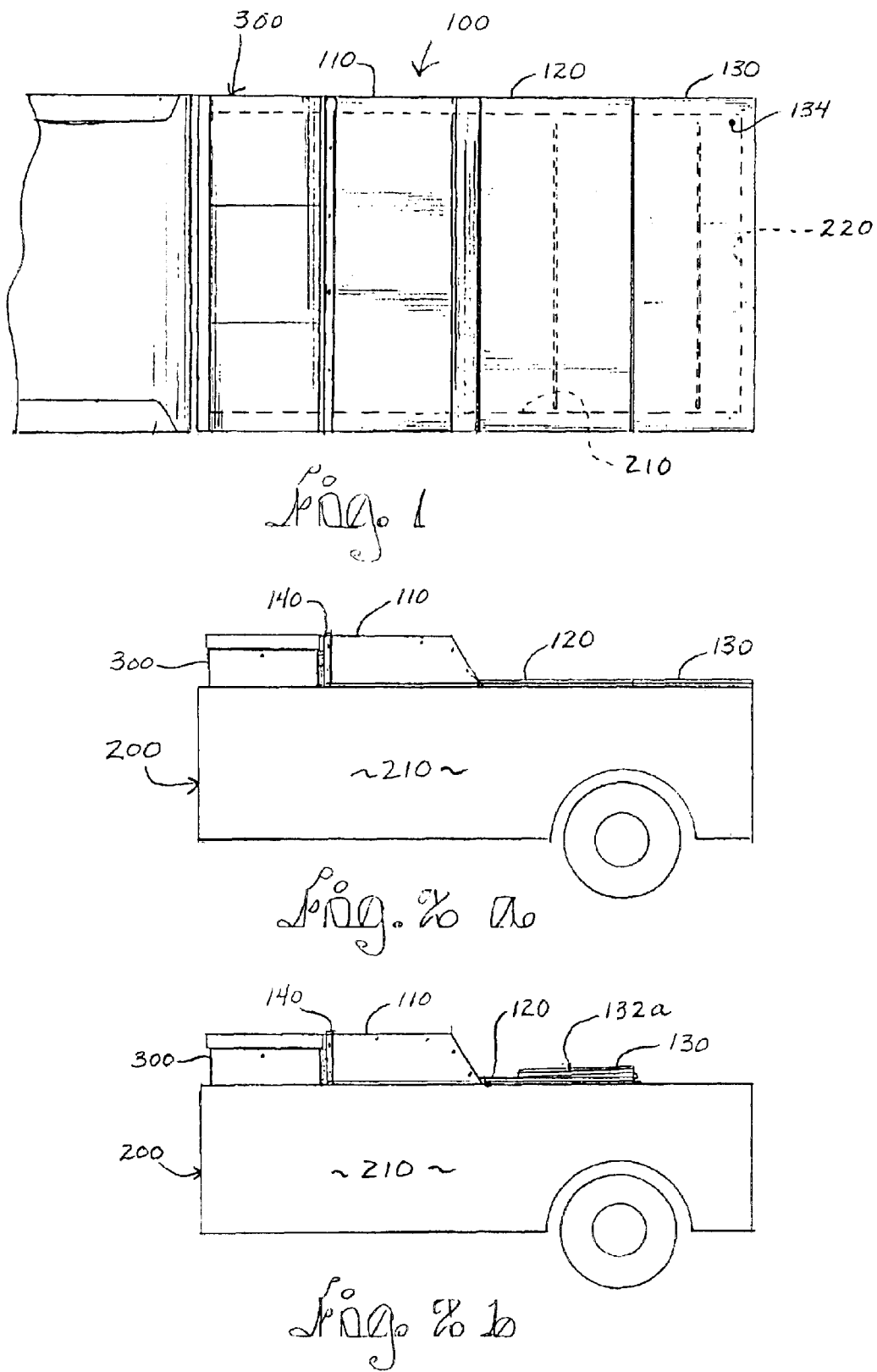

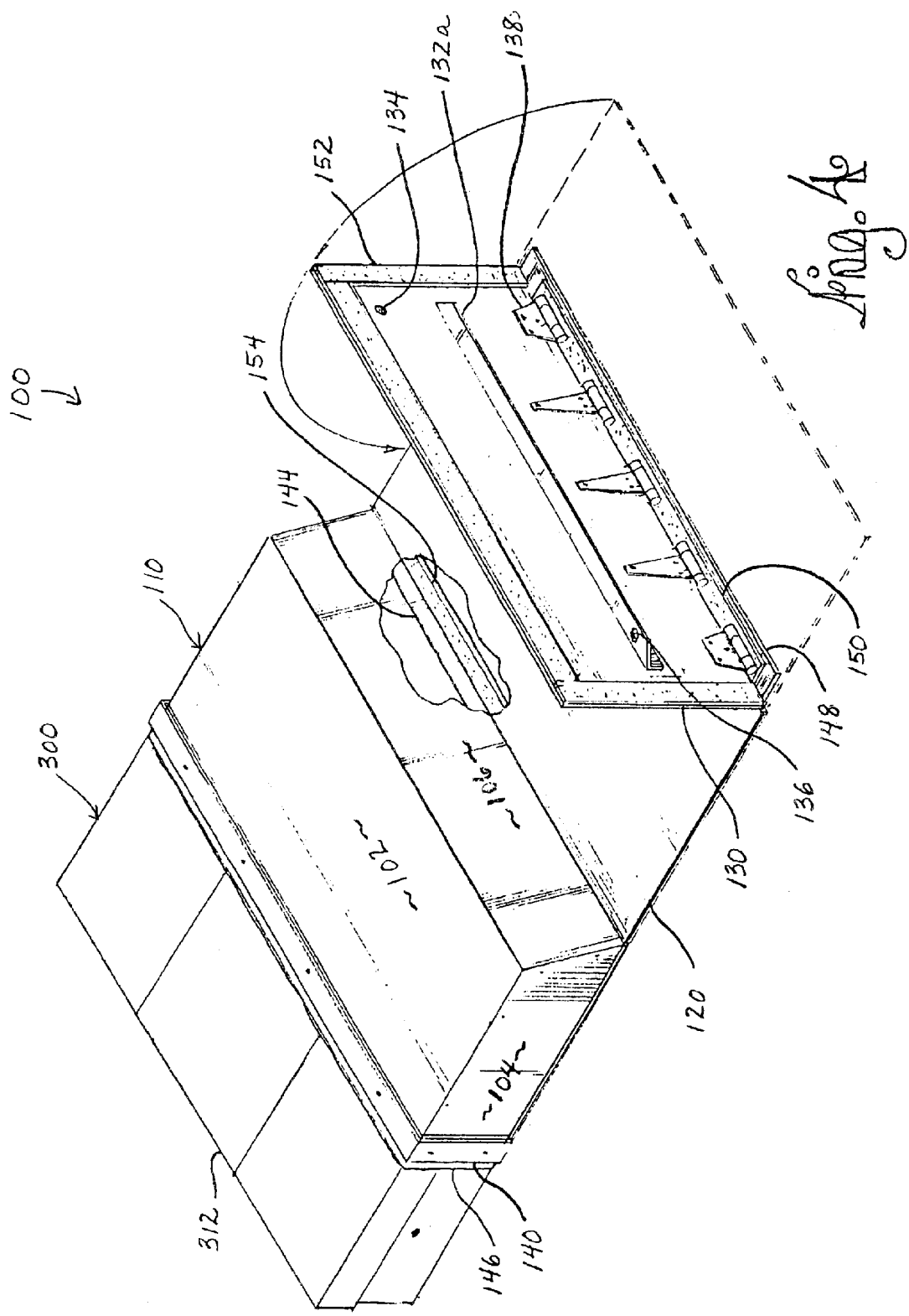

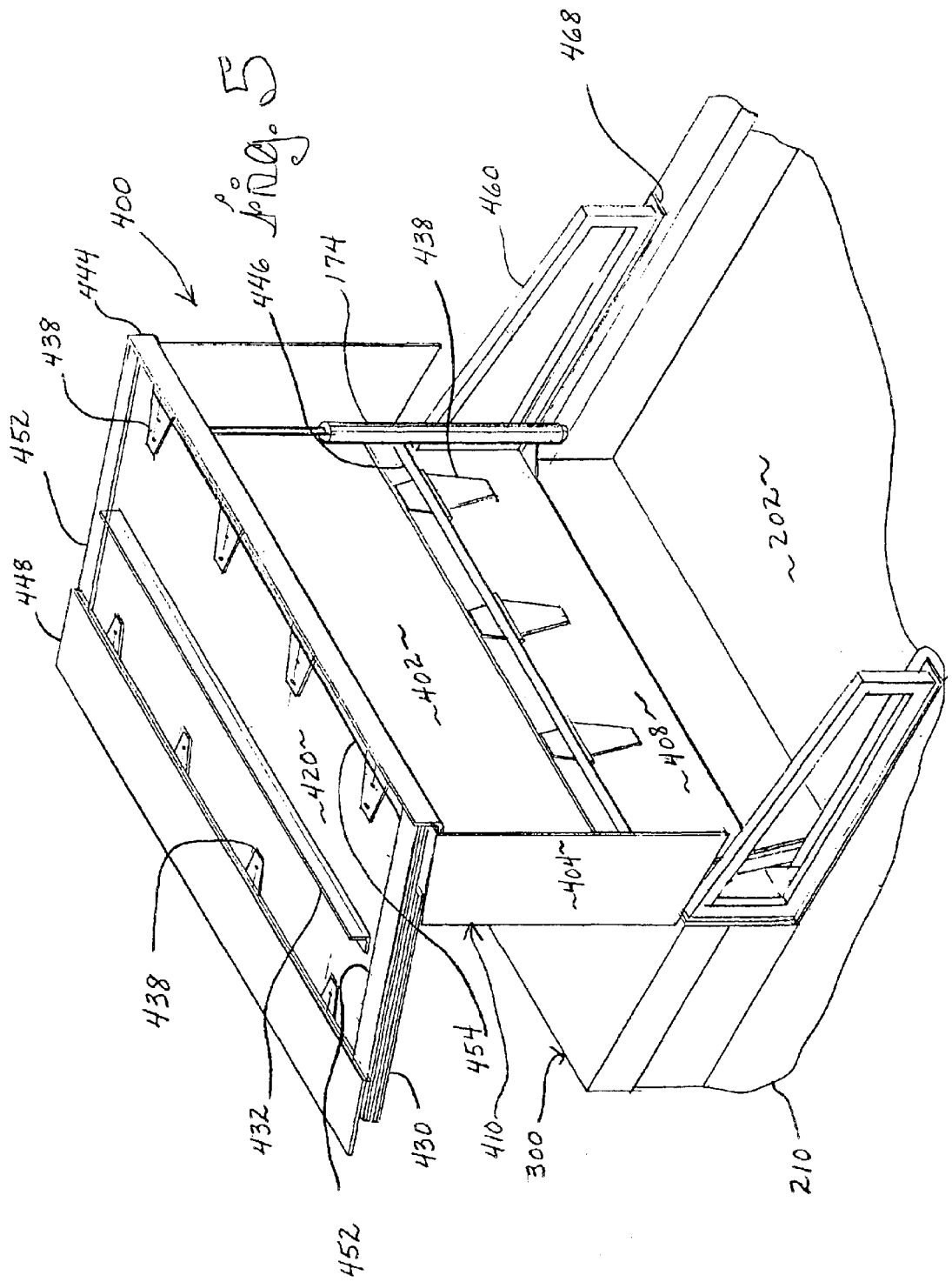

US 6,824,190 B1

TRUCK VAULT

FIELD OF THE INVENTION

This invention relates to the field of covers for truck beds and more particularly to the field of rigid covers adapted to secure items stored within a truck bed.

BACKGROUND OF THE INVENTION

Devices are known in the prior art for covering a truck bed. These devices are principally directed to providing protection from the elements. Those devices that are provided with means for locking the cover in a closed position are often made of relatively light weight materials, such as fiberglass, that are readily cut or broken by a thief. In addition, the prior art devices do not provide a cover that allows use of a standard tool box mounted behind the truck cab, while also allowing storage of large items that project above the walls of the truck bed.

BRIEF SUMMARY OF THE INVENTION

A foldable and securable vault for a truck bed, including a raised front section and at least one flat rear section or panel. The sections are preferably attached to one another using hinged connections. The raised front section is elevated to provide clearance within the truck bed for storage of tall items that project above the side wall or rail of the bed. The rear section is adapted to include, or interface with, a locking mechanism so that the vault may be secured in a closed position. The vault may be folded to allow egress to the truck bed contents. One or more additional sections may be attached between the raised front section and rear section to increase the overall length of the vault.

BRIEF DESCRIPTION OF THE DRAWINGS

FIG. 1 is a top view of a truck vault positioned on the side rails of a truck bed.

FIG. 2a is a side elevation of a truck vault in the closed position, mounted on a truck bed.

FIG. 2b is a side elevation of the truck vault of FIG. 2a with the rear panel folded forward to provide access to the interior of the truck bed.

FIG. 4 is a top perspective view of a truck vault showing the under surface of the rear panel and with portions of the middle panel and raised front section broken away to show the diverter plate and seal.

FIG. 5 is a top perspective view of an alternative embodiment of a truck vault showing the under surface of the middle panel and raised front section.

DETAILED DESCRIPTION

Figure 2C:
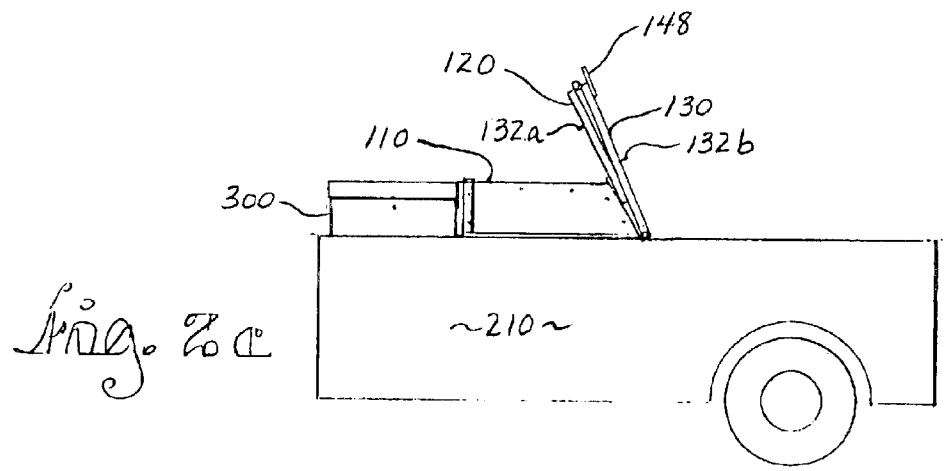
FIG. 2c is a side elevation of the truck vault of FIG. 2b with both the rear and middle panels folded forward to provide access to the interior of the truck bed.

FIGS. 1 through 4 illustrate a vault 100 for securing the contents of a truck bed 200. When mounted to the side rails 210 of a truck bed 200 and secured in a closed position, the vault 100 creates a sealed chamber in which tools and construction materials can be stored securely. The vault 100 includes a plurality of articulated sections including a raised front section 110 and at least one rearward section. Preferably, rearward sections include a middle section 120 and a rear section 130. The raised front section 110 forms an open-bottomed box, which covers an associated underlying portion of a truck bed 200, yet allows storage of items that project above the side rails 210 of the bed 200. The rearward sections 120 and 130 comprise relatively flat rigid panels that rest upon the side rails 210 to cover the portion of the bed 200 rearward of the raised front section 110.

FIG. 1 is a top plan view of a truck vault 100 positioned on the side rails 210 of a truck bed 200. A typical truck, such as a pickup truck 250, has an engine compartment (not shown) and cab 220 located at the fore of the truck 250, and an open bed 200 located aft of the cab 220 at the rearward portion of the truck 250. In FIG. 1, the cab 220 of a truck 250 is shown on the left side of the illustration, with the most forward portion of the cab 220 and the engine compartment omitted from the illustration. The truck bed 200, including side rails 210 and tailgate 220, is shown on the right side of the illustration. The inward edges of the side rails 210 are indicated by dashed lines 210, as is the inward edge of the tailgate 220 at the rear of the truck bed 200.

A toolbox 300 is typically located immediately rearward of the cab 220 and rests on the side rails 210. The raised front section 110 of the truck vault 100 is located immediately rearward of the tool box 300 and also rests on the side rails 210. A middle panel 120 of the vault 100 is connected to, and rearward of, the raised front section 110. The middle panel 120 is in further communication with a rear panel 130. The middle panel 120 is preferably somewhat wider than the rear panel 130 to facilitate folding the panels against the raised front section 110. Typically, the raised front section, middle panel 120 and rear panel 130 are connected to one another using hinges 138. A plurality of individual hinges 138 may be used to connect two articulated elements, as shown in FIG. 4, or a continuous hinge structure (commonly referred to as a piano hinge) may be used.

The raised front section 110 and middle 120 and rear 130 panels are preferably constructed of durable, rigid material such as iron, steel or aluminum plate. If advantageous due to the nature of the selected material, the vault components may be painted or otherwise treated to resist corrosion. The exterior surfaces of the vault 100 may include deformations or protrusions, such as dimples or ridges, to provide a non-skid surface. The preferred non-skid surface design is one well-known as diamond plate.

FIG. 2a is a side elevational view of the truck vault 100 of FIG. 1. The truck vault 100 is shown in the closed position and is mounted on side rails 210 behind the toolbox 300. In order to form a weather-resistant seal between the raised front section 110 and the toolbox 300, the raised front section 110 is provided with an upper seal plate 140 that wraps around and attaches to the side walls 104 and top panel 102 of the raised front section 110. Flexible seal material 146 is sandwiched between the upper seal plate 140 and the side walls 104 and top panel 102 of the raised front section 110. The seal material 146 projects forward of the raised front section 110 and upper seal plate 140 to engage the rear surface of the toolbox 300. The seal material 146 and upper seal plate 140 are also shown in an enlarged perspective view in FIG. 4.

FIG. 2b is a side elevation of the truck vault of FIG. 2a with the rear panel 130 folded upward and forward to lie on the top surface of the middle panel 120, thereby providing access to the rear portion of the truck bed 200.

FIG. 2c is a side elevation of the truck vault of FIG. 2b with both the rear 130 and middle 120 panels folded forward to provide further access to the interior of the truck bed 200. As shown, when the rear 130 and middle 120 panels are folded forward they rest against the rear wall 106 of the raised front section 110. Preferably, the rear wall 106 is angled, as shown in the figures, so that the weight of the panels 120, 130 holds the panels securely in the folded position.

Figure 2D:
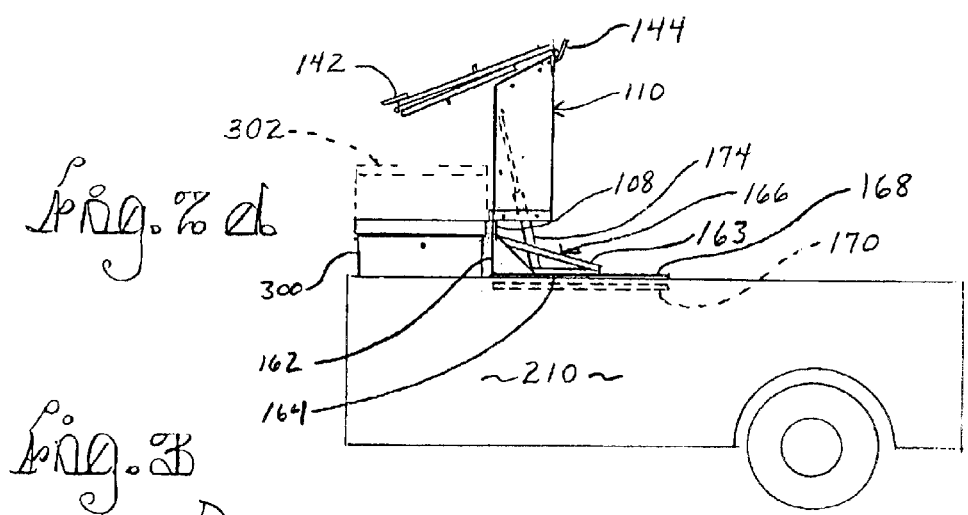
FIG. 2d is a side elevation of a truck vault of FIG. 2c with the rear and middle panels, and the raised front section, folded forward to provide access to the interior of the truck bed.

FIG. 2d illustrates the truck vault 100 of FIG. 2c in a fully opened position. Both the rear 130 and middle 120 panels are folded forward, as is the raised front section 110. The forward edge of the raised front section 110 is articulated with a vertically oriented front wall 108. The front wall 108 is positioned transversely across, and is supported by, the side rails 210 of the truck bed 200.

As illustrated in FIG. 2d, the front wall 108 is connected to, and held in place by, a pair of side brackets which may comprise side plates 162 and angle frames 166. Side plates 162 are typically substantially triangular in shape. Each side plate 162, therefore, typically has at least three edges, a vertically oriented front edge that is attached to the rear face of the front wall 108 and an oblique top edge that slopes downwardly and rearwardly to meet a bottom edge in communication with a mounting bracket 168. Mounting brackets 168 are attached to the portion of each side rail 210 that underlies the raised front section 110. The mounting bracket 168 and front wall 108 are thereby oriented at right angles to one another. Further support may be provided by an angle frame 166 comprising an oblique top element 163 and an attached, horizontally disposed bottom element 164. The bottom element 164 lies along the top surface of, and is fixed to, the mounting bracket 168. The top element 163 attaches to the rearward end of the bottom element 164. The opposite end of the top element 163 attaches to the upper portion of the inside surface of the front wall 108. A safety chain (not shown) may be attached at one end to the inside surface of the raised front section 110 and at the other end to the inside surface of the front wall 108 in order to span the joint between the two elements in a manner that will limit forward rotation of the raised front section 110. Preferably, movement of the raised front section 110 is substantially governed by a braking mechanism 174 such as a hydraulic or pneumatic piston assembly.

As illustrated in FIG. 2d, when the raised front section 110 and middle 120 and rear 130 panels are folded forward to a raised position, portions of the panels may overhang the toolbox 300. Sufficient clearance is provided between the toolbox 300 and the folded panels 120, 130, however, so that the lid 302 of a typical toolbox 300 may be raised to a sufficient height to allow ready access to the toolbox 300 contents. The lid 302 of the toolbox 300 in FIG. 2d is illustrated in such a raised position by dashed lines 302.

If the vault 100 is fabricated from relatively heavy materials, such as iron and/or steel, the combined weight of the folding panels 120, 130 and raised front section 110, may be significant. An unexpected advantage of the present invention, is that when the folded panels 120 and 130 rest upon the slanted or sloped rear wall 106 of the raised front section 10, as illustrated in FIG. 2d, the center of gravity of the folded elements is shifted forward and downward so that they are relatively balanced when in the open position. This feature of the invention minimizes accidental closure of the vault 100 and reduces wear on the braking mechanisms 174.

Figure 3:
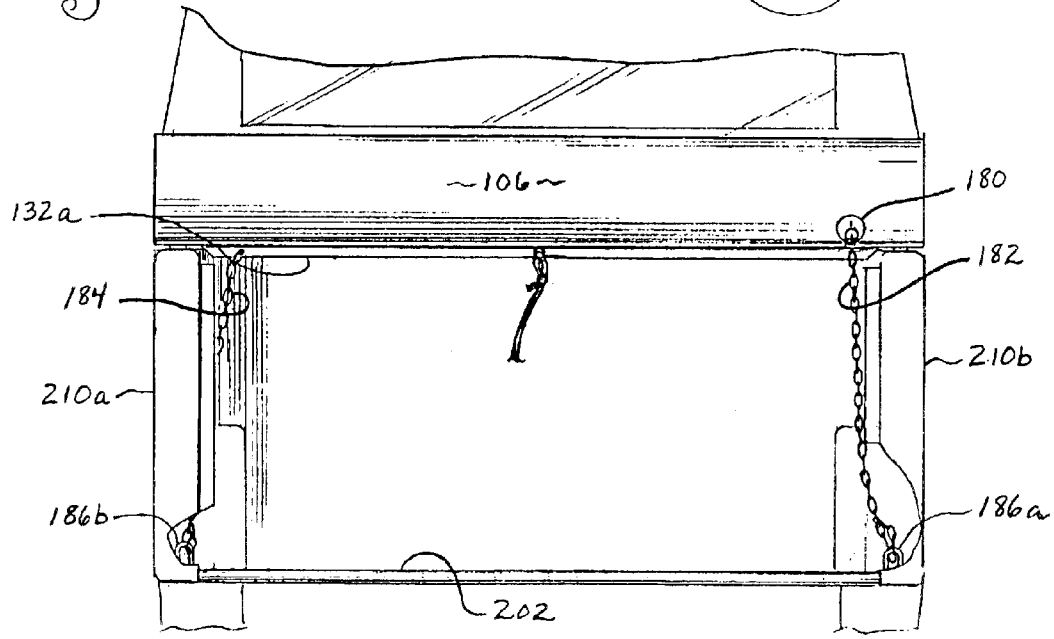
FIG. 3 is an elevational view of the rear portion of a truck bed with portions of the tail gate and side rails broken away to show attachment of security chains to panels.

FIG. 3 is an elevational view of the rear portion of a truck bed 200, including a truck vault 100 in the closed position. The tailgate 220 has been omitted from the drawing, and portions of the side rails 210 broken away, to show attachment of security chains 182 and 184 to the rear panel 130. As illustrated in FIG. 3, security chain 182 is attached at its lower end to a hook or eye 186a, typically provided on or near the floor 202 of a truck bed 200. The upper portion of chain 182 passes through an aperture 134 in the rear panel 130. This aperture 134 may be more clearly viewed in FIG. 4.

As illustrated in FIG. 3, a locking mechanism may be engaged with the upper portion of the chain 182 to secure it to the rear panel 130. A portion of the shackle of a padlock 180 is passed through the aperture 134 and engaged with a proximate link in chain 182. If the shackle is too wide to pass through the aperture 134, it may engage a portion of the chain 182 projecting upward through the aperture 134. After engaging the chain 182, the padlock 180 is then locked, securing the rear panel 130, and thereby the middle panel 120 and raised front section 110, in the closed position. It should be apparent that to effectively secure the panel 130, the padlock 180 must not be able to completely pass through the aperture 134 once locked. If the length of the chain 182 closely approximates the distance between the bottom of the truck bed 200 and the rear panel 130, this locking arrangement secures the vault 100 in a closed position relative to the upper surfaces of the side rails 210.

An alternative method of locking the vault 100 in the closed position may be utilized when the tailgate 220 of a truck 250 is not provided with its own locking mechanism. Instead of, or in addition to chain 182, a metal bar (not shown) is vertically fixed to the inner, vertical face of the tailgate 220, and positioned so that an upper portion of the bar is disposed in proximity to aperture 134. A locking mechanism may then be engaged with a hole provided in the upper portion of the bar, to lock the rear panel 130 and vault 100 in the closed position. This alternative method not only secures the vault 100, but locks the tailgate 220 in a closed position, as well.

To increase the stiffness or rigidity of the panels 120, 130, support means may be incorporated into the structure or attached to the surface of the panels. For example, a support bar (see 132a and 132b) of rigid material, such as angle iron, maybe attached to the under surface of the panels 120, 130. FIG. 4 illustrates such a support bar 132a attached transversely to the lower surface of the rear panel 130. FIGS. 2b to 2d show the bars 132a and 132b projecting from the lower surfaces of panels 130 and 120.

The support bars 132 may be provided with apertures 136, or other effective means, for attachment of security chains 184, as shown in FIG. 3. FIG. 3 also illustrates a pull rope or strap 188 attached to bar 132a. The pull rope 188 may be provided for pulling the panels closed from a previously selected upward position, as shown in FIGS. 2b to 2d.

In order to protect the contents of the truck bed 200 from the elements, a system of seals and seal plates is used to divert water, dirt and debris from entering through interstices or gaps between vault elements or between the vault 100 and the side rails 210 of the truck bed 200. As illustrated in FIGS. 2c, 2d and 4, a lower seal plate 146 is secured to the underside of the rear edge of the middle panel 120. The lower seal plate 146 projects rearward beyond the rear edge of the middle panel 120 so that it may contact the underside of the forward edge of the rear panel 130, when the rear panel 130 is in the closed position. Alternatively, the lower seal plate 146 may be formed from an extension of the middle panel 120.

To further enhance the sealing capabilities of the seal plate 146, sealing material 150 may be attached to the portion of the upper surface of the seal plate 148 that contacts the rear panel 130. Sealing material 152 may also be attached along the underside margins of the rear plate 130 and middle panel 120. Preferably, the sealing material 150 comprises durable, UV and moisture resistant, rubberized foam.

In order to prevent water, dirt or debris from entering a gap between the raised front section 110 and middle panel 120, a diverter plate 144 may be positioned below the juncture of the raised front section 110 and middle panel 120 to span the gap. As illustrated in FIGS. 2d and 4, a diverter plate 144 is attached to the inner surface of the rearward edge of rear wall 106. The diverter plate 144 extends horizontally rearward of the raised front section 110 a distance sufficient to contact the underside of the forward edge of the middle panel 120. Sealing material 154 is attached to the upper surface of the diverter plate 144 to contact the underside of the front portion of the middle panel 120. (See portion of juncture between raised front section 110 and middle panel 120 broken away to reveal diverter plate 144 and sealing material 154, FIG. 4.)

Additional sealing material (not shown) maybe applied to the upper surface of the mounting bracket 168 to form a seal between the mounting bracket 168 and side walls 104 of the raised front section 110 when the raised front section 110 is in the closed position. The disclosed arrangement of seal plates 140, 148, diverter plate 144, and sealing material 150, 152, 154 substantially prevents intrusion of water, dirt and debris into the interior of the truck bed 200 when the truck vault 110 is secured in a closed position.

It may be appreciated that for truck beds 200 of relatively short front-to-rear dimensions, the middle panel 120 may be omitted and a rear panel 130 of appropriate dimensions attached directly to the raised front section 110. In addition, for relatively long truck beds, multiple middle panels 120 may be connected between the raised front section 110 and rear panel 130. Preferably, the raised front section 110 is of substantially the same height as a standard toolbox 300, however the raised front section 110 may be constructed at greater or lesser heights depending on the needs of the user and the anticipated size of the items to be enclosed within the truck bed 200.

To secure the truck vault 100 to the side rails 210 of a truck bed 200, bolts (not shown) may be inserted through holes (not shown) passing through the surface of the mounting bracket 168 and further through the upper surface of the sidewall 210. The bolts may then be secured using lock washers and nuts (not shown). Because the material used to construct the side rails 210 may be relatively thin, a stabilizer plate 170 may be located under the associated surface of the side wall 210. The side wall 210 material is then sandwiched between the stabilizer plate 170 and the mounting bracket 168. Bolts may be inserted through the mounting bracket 168, side wall 210 and stabilizer plate 170 and secured with lock washers and nuts.

FIG. 5 illustrates an alternative embodiment of a vault 400 for a truck bed 200 comprising a plurality of articulated sections and panels adapted to extend across the side rails 210 of a truck bed 200. The vault 400 includes a vertical front wall 408 supported and maintained in an upright position by side brackets 460. The side brackets 460 are attached either directly or via mounting brackets 468 to the side rails 210. The front wall 408 forms the forward enclosing portion of the raised front section 410. The raised front section 410 further includes a top panel 402, side walls 404 attached to and depending from the lateral edges of the top panel 402, and a rear wall (see rear wall 106 shown in FIG. 4) extending downwardly from the rear edge of the top panel 402 and in communication with the side walls 404. The front wall 408 is connected at its upper edge, via binges, to the forward edge of the top panel 402. The rear wall is connected at its lower edge via hinges 438 to the forward edge of a middle panel 420, and a rear panel 430 is connected at its forward edge to the rear edge of the middle panel 420. The rear panel 430, middle panel 420 and raised front section 410 extend across and are supported by the side rails 210 of the truck bed. It should be appreciated that, the panels 420 and 430 and raised front section 410 may be supported by additional structures incorporated into the surface of, or attached to the surface of, the side rails 210.

The vault 400 includes means for scaling interstices between the articulated panels 420 and 430, the raised front section 410 and the front wall 408, such as elongated strips of sealing material. As illustrated in FIG. 5, sealing material 446 may be attached to the underside of the top panel 402, where the top panel 402 joins the front wall 408, to seal any gap between the top panel 402 and front wall 408. Sealing material 454 may also be attached to the underside of the middle panel 420 where it contacts the top surface of the diverter plate 444. The diverter plate 444 is attached to the raised front section 410 as described above and as shown in FIGS. 2d and 4. Although not shown in FIG. 5, sealing material may also be applied to the under surface of the rear panel 430 where it contacts the top surface of the seal plate 448, and to the under surface of the mounting brackets 468. Additional sealing material 452 may be applied to the under surfaces of the panels 420 and 430 where they contact the side rails 210.

It is to be understood that while certain forms of this invention have been illustrated and described, it is not limited thereto except insofar as such limitations are included in the following claims and allowable equivalents thereof.

Having thus described the invention, what is claimed as new and desired to be secured by Letters Patent is as follows:

1. A vault for a truck bed comprising:

a plurality of articulated sections including a raised front section and at least one rear section, hinge structure interconnecting said sections and adapting the sections for swinging movement about axes orthogonal to the fore-and-aft axis of a truck bed, said sections having a closed condition in which the sections are adapted to overlie the side rails of a truck bed, said raised front section presenting a housing for clearing articles in a truck bed when said sections are in said closed condition, said rear section being swingable to an open position resting on said raised front section, and a support mounting said raised front section for forward swinging movement to a stored position with said rear section thereon, whereby to provide full access to the truck bed until it is desired to return the articulated sections to the closed condition overlying the bed.

2. In combination with a truck bed having side rails, a foldable cover comprising:

a plurality of articulated sections including a raised front section and at least one rear section, said sections having a closed condition overlying said rails of the truck bed, hinge structure interconnecting said sections for swinging movement about axes orthogonal to the fore-and-aft axis of the truck bed, said raised front section presenting a housing for clearing articles in the truck bed when said sections are in said closed condition, said rear section being swingable to an open position resting on said raised front section, a support mounting said raised front section for forward swinging movement to a stored position with said rear section thereon, whereby to provide full access to the truck bed until it is desired to return the articulated sections to the closed condition overlying the bed, each of said sections presenting outer margins overlying said rails when the sections are in said closed condition, and elongated sealing elements extending along said margins and engaging said rails when said sections are in said closed condition to provide a weather resistant seal when the cover is closed.

3. A foldable cover for a truck bed comprising:

a plurality of articulated rigid panels, said panels including a rear panel extending across the side rails of the rearward portion of a truck bed, and a middle panel extending across the side rails of the middle portion of a truck bed, a raised front section comprising a horizontally oriented top panel, side walls connected to and vertically depending from side portions of said top panel, and a rear wall extending downwardly from a rear portion of said top panel and in communication with said side walls, said rear wall articulated at its lower portion with a forward edge of said middle panel, a front wall articulated with and vertically depending from a forward portion of said top panel, means for attaching said front wall to said side rails, means for sealing interstices between said articulated panels, said raised front section and said front wall, means for securing said rear panel in a closed position, and means for regulating the movement of said raised front section.

4. The foldable cover of claim 3 wherein said means for sealing interstices includes seal plates secured to the underside of panels.

5. The foldable cover of claim 3 wherein said means for sealing interstices includes a diverter plate secured to the underside of said rear wall and extending rearward to contact the underside of the panel rearward of the raised front section.

6. The foldable cover of claim 3 wherein said means for securing includes a restraint attached to an inside surface of the truck bed and removably secured to said rear panel to hold said rear panel against said side rails.

7. The foldable cover of claim 3 wherein said means for regulating the movement of said raised front section includes a braking mechanism attached to a rearward surface of said front wall, and to an underside surface of said top panel.

8. The foldable cover of claim 3 wherein said panels comprise sheets of ferrous metal.

9. The foldable cover of claim 3 wherein said panels comprise sheets of aluminum.

10. The foldable cover of claim 3 wherein said panels include a pattern of deformations on the surface of said panels to provide a non-skid surface.

11. The foldable cover of claim 6 wherein said braking mechanism comprises a plunger mechanism providing resistance to movement via friction.

12. The foldable cover of claim 6 wherein said braking mechanism comprises a plunger mechanism providing resistance to movement via hydraulic or pneumatic pressure.

13. A method for securing the contents of a truck bed comprising the steps of:

providing a plurality of hingedly connected, rigid panels, each panel extending across the transverse side rails of a truck bed, providing a raised front section that extends across the side rails of the truck bed, positioning the raised front section forward of the panels and rearward of the truck cab or an existing tool box, hingedly connecting the rearward edge of the raised front section to the forward-most panel, hingedly connecting the forward edge of the raised front section to a vertical front wall, attaching the front wall to the side rails of the truck bed, and providing a means for securing the panels and raised front section in a closed position.

14. The method of claim 12 further comprising the step of providing strips of sealing material on the underside portions of each panel such that the sealing material contacts the portions of the side rails supporting the panels.

15. The method of claim 12 further comprising the step of providing seal plates on the underside of each forward, adjoining panel to contact the underside of the rearward, adjoining panel, thereby forming a seal between the adjoining panels when in a closed position.

16. The method of claim 12 further comprising the step of sealing any gap between the raised front section and the truck cab or existing tool box.

17. The method of claim 12 further comprising the step of providing a diverter plate that projects horizontally rearward from the raised front section to a position underneath and in contact with the lower surface of the front edge of a rearwardly connected panel.

* * * * *